Nov. 1, 1938.　　　　O. F. METZ　　　　2,135,467
VARIABLE PITCH SHEAVE
Filed June 20, 1936
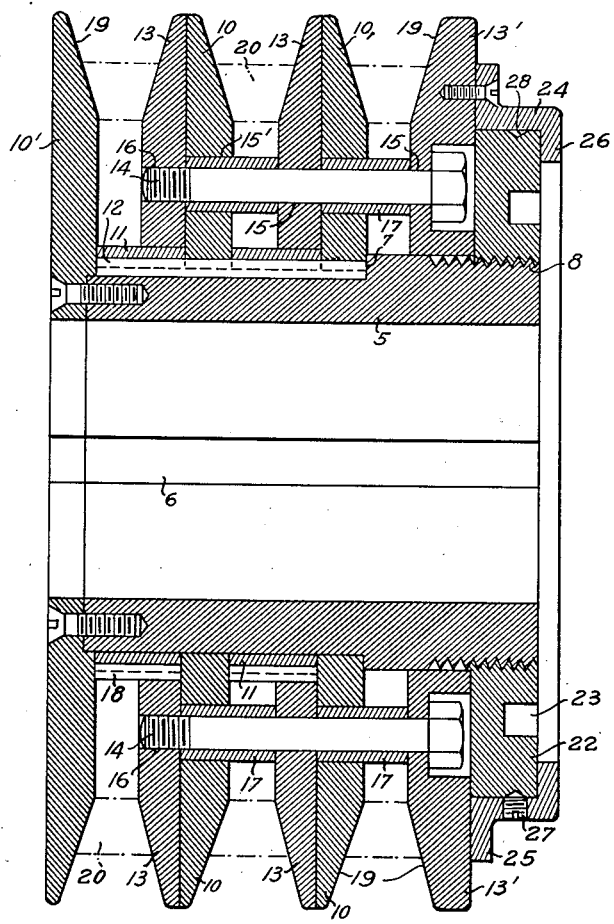
Inventor
O. F. Metz
by
G. A. DeWein
Attorney Patented Nov. 1, 1938

2,135,467

UNITED STATES PATENT OFFICE 2,135,467

VARIABLE PITCH SHEAVE

Ora F. Metz, El Paso, Tex., assignor to Allis-Chalmers Manufacturing Company, Milwaukee, Wis., a corporation of Delaware Application June 20, 1936, Serial No. 86,297

1 Claim. (Cl. 74—230.17)

This invention relates to variable speed drive mechanism, and particularly to a sheave having an adjustable effective pitch diameter for transmitting power at variable speeds.

The principal objects of the invention are to provide a variable pitch sheave for use with single or multiple V-belts, which is simple and rugged in construction, which provides for the same change of diameter in all belt grooves simultaneously in a plural belt sheave, and which is positive in operation. Other objects of the invention will appear from a consideration of the following description thereof.

Transmission by means of plural V-belts of resilient composition has been of increasing importance in many industries. This form of transmission has found favor because of its flexibility of application, its positive operation combined with freedom from shock, and its ease of application to a great variety of uses. In many of these uses, ranging from air conditioning fans and pumps to textile spinning machinery drives, it has become increasingly desirable to be able to vary the speed of the drives at will, without disassembling the drive or changing belts and/or sheaves. This invention is designed to fill that need.

The invention comprises generally a hub or other cylindrical support provided with two series of disks or flanges which are provided with complementary conical belt coacting peripheral surfaces. One series of disks is uniformly spaced and is fixed to its hub in stationary position relative thereto. The second series of disks is movable as a unit relative to the hub, and the disks of this series alternate with the disks of the first series axially of the hub. The individual disks of the movable series are clamped into one movable unit by means of rods, pins or bolts which are fastened to the end movable disks and pass through the intervening fixed and slidable disks, the adjacent slidable disks being spaced from each other by means of sleeves mounted on said rods, each sleeve abutting at its ends two adjacent slidable disks and passing freely through the intervening fixed disk. Means are provided for moving the slidable disks longitudinally of the hub, and for temporarily fixing the slidable disk unit at any desired position.

The opposing conical surfaces of adjacent slidable and stationary disks form V-shaped grooves for coacting with a plurality of V-belts. As the slidable disks are moved away from their complementary fixed disks, the effective pitch diameter of the surface coacting with a V-belt of given width is decreased, and as the complementary disks are moved toward each other the effective pitch diameter is increased. Thus a variation in speed is obtainable from a shaft rotating at constant speed. The variable pitch sheave may be mounted on either the driving or driven shaft, or one variable pitch sheave may be mounted on each shaft; and in the latter case a variation of speed is obtainable which is approximately double that which can be obtained with the use of only one variable pitch sheave in the drive.

Referring more specifically to the drawing the single figure shows a central sectional view of a preferred form of this invention.

The hub 5 is provided with a keyway 6 for fixing the hub on a shaft, and is provided with a shoulder 7 near one end and a threaded portion 8. It is clear that a hub need not be used, since the disks to be described may be mounted on any cylindrical support, or even directly on the driving or driven shaft.

Mounted on the hub is a series of fixed disks 10, an end disk of this series abutting shoulder 7 of the hub. The fixed disks are spaced from each other by suitable spacing means such as spacing rings 11. These disks and spacing rings are retained against axial movement along the hub by end disk 10' which is fixed to the hub in any suitable manner. Angular movement of fixed disks 10 and spacing rings 11 is prevented by key 12, so that the series of disks 10, 10' is rigidly fixed on the hub.

A second series of disks 13 is mounted for axial movement with respect to the hub, and comprises individual disks 13 located between adjacent fixed disks 10, and adapted to slide freely on the periphery of spacing rings 11, but retained against angular movement thereon by means of key 18. The slidable disks are clamped together by means of rods, pins or bolts, and spacers. In the illustrated construction the clamping means comprises bolts 14, which are threaded at one end into a tapped bore 16 in one slidable end disk 13, the heads of the bolts being countersunk in the other slidable end disk 13'. The bolts are adapted to pass freely through bolt apertures 15 in slidable disks 13. Spacing sleeves 17 are carried by bolts 14 and abut at their ends against slidable disks 13, said sleeves being adapted to pass freely through apertures 15' in intervening fixed disks 10.

It will therefore be apparent that the slidable disks are rigidly clamped together to move as a unit axially of the hub, but are restrained against angular movement relative thereto. This movement of all the slidable disks as a unit results in equal change in diameter in all grooves, so that all belts must be equally affected by any variation in effective pitch diameter.

Variation in pitch diameter is effected by causing rotation of adjusting nut 22 on the threaded end portion 8 of the hub, the adjusting nut being held against axial movement relative to the slidable disk unit by means of retaining ring 24. The retaining ring is provided with flange 25 which abuts and is fixed to end movable disk 13'; while flange 26 abuts adjusting nut 22 and holds it in sliding contact with end disk 13'. Adjusting nut 22 is provided with wrench sockets 23, whereby the nut may be rotated by inserting a pin spanner wrench (not shown) thereon.

When slidable disks 13 have been moved to the desired position, they may be retained in that position by tightening set screw 27 which prevents undesired movement of adjusting nut 22. An annular groove 28 may be provided on the periphery of adjusting nut 22 to cooperate with set screw 27.

To vary the effective pitch diameter of the sheave it is necessary to loosen set screw 27, turn adjusting nut 22 in the desired direction (thus moving the slidable disk unit) and again tighten the set screw. The sheave is then ready for use.

While a three-groove sheave is shown for purposes of illustration, it is clear that any number of grooves, from one to any desired number, may be embodied in a sheave of this construction. Numerous other modifications of the construction disclosed will be apparent to those skilled in the art. The invention is not limited to the exact details of construction shown, but includes such variations and modifications as come within the scope of the appended claim.

It is claimed and desired to secure by Letters Patent:

A variable pitch sheave comprising a hub exteriorly threaded at one end, a plurality of disks fixed on said hub, a plurality of slidable disks mounted on said hub in alternating relation with said fixed disks, means passing freely through said fixed disks and clamping said slidable disks into a unitary structure, an adjusting nut threadably engaging said exteriorly threaded end of said hub, and a retaining ring fixed to said slidable disk unit and restraining said adjusting nut from axial movement relative to said slidable disk unit.

ORA F. METZ.